United States Patent
Oishi et al.

(10) Patent No.: US 11,654,505 B2
(45) Date of Patent: May 23, 2023

(54) METHOD OF MANUFACTURING TERMINAL-EQUIPPED ELECTRIC WIRE AND METHOD OF DAMPING ELECTRIC WIRE

(71) Applicant: YAZAKI CORPORATION, Tokyo (JP)

(72) Inventors: Yasusada Oishi, Makinohara (JP); Naotaka Torimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 253 days.

(21) Appl. No.: 16/854,941

(22) Filed: Apr. 22, 2020

(65) Prior Publication Data
US 2020/0331092 A1 Oct. 22, 2020

(30) Foreign Application Priority Data
Apr. 22, 2019 (JP) .............. JP2019-081010

(51) Int. Cl.
*B23K 20/10* (2006.01)
*H01R 43/02* (2006.01)
*H01R 4/18* (2006.01)
*H01R 4/02* (2006.01)

(52) U.S. Cl.
CPC ............ *B23K 20/10* (2013.01); *H01R 4/023* (2013.01); *H01R 4/029* (2013.01); *H01R 4/185* (2013.01); *H01R 43/0207* (2013.01); *H01R 43/0249* (2013.01)

(58) Field of Classification Search
CPC .. B23K 20/10; B23K 20/004; H01R 43/0207; H01R 43/0249; H01R 4/023; H01R 4/029
See application file for complete search history.

(56) References Cited

U.S. PATENT DOCUMENTS

| | | | | |
|---|---|---|---|---|
| 4,119,448 | A | * 10/1978 | Hermanson | ......... B29C 66/4324 156/73.4 |
| 2013/0146644 | A1 | 6/2013 | Ruhl et al. | |
| 2015/0288123 | A1* | 10/2015 | Wagner | .................. H01R 4/029 228/110.1 |
| 2016/0116355 | A1* | 4/2016 | Stroh | .................... G01L 5/0076 702/43 |

FOREIGN PATENT DOCUMENTS

| | | |
|---|---|---|
| DE | 102013021278 B3 | 6/2015 |
| JP | 2007-294154 A | 11/2007 |
| JP | 2008-157428 A | 7/2008 |
| JP | 2013-538689 A | 10/2013 |

OTHER PUBLICATIONS omnicalculator.com, "Wavelength Calculator", https://www.omnicalculator.com/physics/wavelength ,Sep. 20, 2022 (Year: 2022).*

* cited by examiner

*Primary Examiner* — Erin B Saad
*Assistant Examiner* — Carlos J Gamino
(74) *Attorney, Agent, or Firm* — Kenealy Vaidya LLP (57) ABSTRACT

A method of manufacturing a terminal-equipped electric wire, includes: connecting a terminal fitting to one end of an electric wire in which a conductor is covered with a jacket; clamping a range of a predetermined length in a length direction at an intermediate portion of the electric wire with a pair of plate bodies; and performing an ultrasonic joining processing by applying an ultrasonic vibration to the conductor exposed at the other end of the electric wire.

4 Claims, 7 Drawing Sheets

METHOD OF MANUFACTURING TERMINAL-EQUIPPED ELECTRIC WIRE AND METHOD OF DAMPING ELECTRIC WIRE

CROSS REFERENCE TO RELATED APPLICATIONS

This application is based on and claims priority from Japanese patent application No. 2019-081010 filed on Apr. 22, 2019, the entire contents of which are incorporated herein by reference.

BACKGROUND OF THE INVENTION

1. Technical Field

The present invention relates to a method of manufacturing a terminal-equipped electric wire and a method of damping an electric wire.

2. Background Art

It is known that, when an electric wire is provided with a terminal fitting at one end and an ultrasonic joining processing or an ultrasonic welding processing is performed at the other end of the electric wire, a vibration attenuating portion is formed by deforming the electric wire itself into a predetermined shape between the terminal fitting and a joining portion or a welding portion (see, Patent Literature JP-A-2007-294154). According to a welding method described in Patent Literature JP-A-2007-294154, a vibration transmitted to the terminal fitting during the ultrasonic welding processing can be attenuated by a vibration attenuating portion, and an influence on a terminal can be reduced.

SUMMARY

However, in the welding method described in Patent Literature JP-A-2007-294154, the electric wire is wound around a columnar jig and deformed, so that the electric wire has a curl after welding. Therefore, a complicated operation for correcting a shape of the electric wire after welding is required.

The invention has been made in view of the above circumstances, and an object of the invention is to provide a method of manufacturing a terminal-equipped electric wire and a method of damping an electric wire capable of manufacturing a high-quality terminal-equipped electric wire, which is connected to a terminal fitting at one end, by performing an ultrasonic joining processing at the other end, without performing a complicated post-joining operation.

In order to achieve the above object, a method of manufacturing a terminal-equipped electric wire and a method of damping an electric wire according to the present invention is characterized by the following (1) to (4).

(1) A method of manufacturing a terminal-equipped electric wire, comprising:
connecting a terminal fitting to one end of an electric wire in which a conductor is covered with a jacket;
clamping a range of a predetermined length in a length direction at an intermediate portion of the electric wire with a pair of plate bodies; and
performing an ultrasonic joining processing by applying an ultrasonic vibration to the conductor exposed at the other end of the electric wire.

(2) The method of manufacturing a terminal-equipped electric wire according to above (1), comprising:
when performing the ultrasonic joining processing by applying the ultrasonic vibration to the other end of the electric wire, spacing apart a plurality of the pair of plate bodies in the length direction at the intermediate portion of the electric wire.

(3) The method of manufacturing a terminal-equipped electric wire according to above (1), comprising:
clamping the electric wire with a clamping force which is set to be weaker than a force of plastic deformation of the jacket of the electric wire, and is such that the jacket is hardened by pressing with the plate bodies and a friction of the jacket against the conductor is increased.

(4) A method of damping an electric wire, comprising:
clamping, by a pair of plate bodies, a range of a predetermined length in a length direction at an intermediate portion of an electric wire in which a conductor is covered with a jacket; and
performing an ultrasonic joining processing by applying an ultrasonic vibration to the conductor exposed at an end portion of the electric wire.

According to the method of manufacturing a terminal-equipped electric wire of a configuration of the above (1), when the ultrasonic vibration is applied to the other end of the electric wire, the vibration transmitted through the conductor of the electric wire is attenuated at the intermediate portion of the electric wire clamped with the pair of plate bodies, and the transmission to one end to which the terminal fitting is connected is reduced. Accordingly, it is possible to reduce an influence of the vibration on the terminal fitting connected to one end of the electric wire and reduce product defects of the terminal fitting.

Compared with a method of attenuating a vibration by winding the electric wire around a columnar jig and making the electric wire deformed, a high-quality terminal-equipped electric wire can be manufactured without performing a complicated correction operation of the electric wire after the ultrasonic joining processing.

The ultrasonic vibration applied to the conductor at the other end of the electric wire is transmitted as a longitudinal wave toward one end side of the electric wire to which the terminal fitting is connected. The longitudinal wave transmitted to the electric wire has a peak where the vibration attains a maximum value and a node where the vibration attains a minimum value. Positions of a peak and a node of the vibration vary depending on a material and a thickness of the electric wire, a number of strands, whether the conductor is a twisted wire, a degree of twist of the conductor, and the like. As described above, when the peak and the node of the vibration vary, even if a position where the electric wire is clamped is at a node of the vibration, it is difficult to have a sufficient attenuating effect. However, in the invention, since the range of the predetermined length at the intermediate portion of the electric wire is clamped with the pair of plate bodies, even if a node of vibration is located in a clamping range of the electric wire, both sides of this node of vibration can be sufficiently clamped, and the vibration can be reliably attenuated.

A frequency of the ultrasonic vibration applied when performing the ultrasonic joining processing on the conductor of the electric wire fluctuates little by little around a certain frequency. Therefore, as in the invention, by clamping the electric wire between surfaces of the pair of plate bodies, it is possible to effectively attenuate even a vibration whose frequency fluctuates little by little.

A case where the range of the predetermined length at the intermediate portion of the electric wire is clamped with the pair of plate bodies is equivalent to a set of a case where one point is clamped, so that an effect of reducing a vibration even with a plurality of frequencies is obtained.

According to the method of manufacturing a terminal-equipped electric wire of a configuration of the above (2), at a plurality of positions spaced apart in the length direction at the intermediate portion of the electric wire, by clamping and pressing the range of the predetermined length from both sides with the pair of plate bodies, the vibration whose nodes fluctuate in the length direction can be more effectively attenuated at the plurality of positions in the length direction of the electric wire.

According to the method of manufacturing a terminal-equipped electric wire of a configuration of the above (3), it is possible to effectively attenuate the ultrasonic vibration transmitted as a longitudinal wave vibrating the conductor of the electric wire along the length direction by generating an appropriate frictional force between the jacket and the conductor while reducing a quality deterioration due to the plastic deformation of the jacket of the electric wire.

According to a method of damping an electric wire of a configuration of the above (4), when the ultrasonic vibration is applied to the end portion of the electric wire, the vibration transmitted through the conductor of the electric wire is attenuated at the intermediate portion of the electric wire clamped with the pair of plate bodies, and the transmission to an end portion of the other end of the electric wire is reduced. It is possible to reduce, even when a member is connected to the end portion of the other end of the electric wire, the influence of the vibration on the member.

Compared with a method of attenuating a vibration by winding the electric wire around a columnar jig and making the electric wire deformed, it is not necessary to perform a complicated correction operation of the electric wire after the ultrasonic joining processing.

According to the present invention, a method of manufacturing a terminal-equipped electric wire and a method of damping an electric wire can be provided, which is capable of manufacturing a high-quality terminal-equipped electric wire, which is connected to a terminal fitting at one end, by performing an ultrasonic joining processing at the other end, without performing a complicated post-joining operation.

The invention is briefly described as above. Further, the details of the invention will be further clarified by reading through an aspect described below (hereinafter, referred to as "embodiment") with reference to the accompanying drawings.

DETAILED DESCRIPTION OF EMBODIMENTS

A specific embodiment according to the invention is described with reference to drawings.

Figure 1:
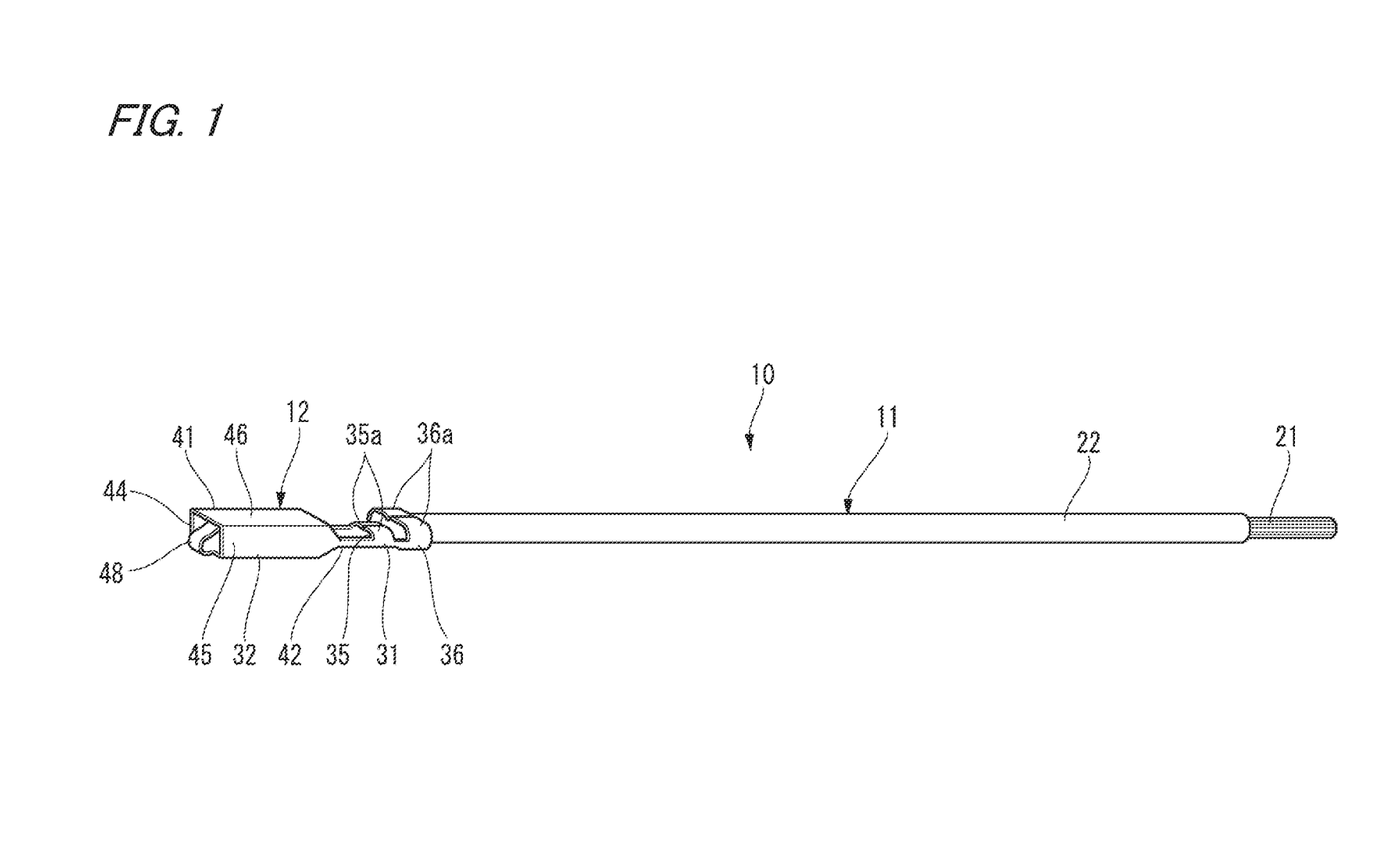
FIG. 1 is a perspective view showing a terminal-equipped electric wire according to an embodiment of the invention.

FIG. 1 is a perspective view showing a terminal-equipped electric wire according to an embodiment of the invention.

As shown in FIG. 1, a terminal-equipped electric wire 10 includes an electric wire 11 and a terminal fitting 12 connected to one end of the electric wire 11.

The electric wire 11 is an insulated electric wire having a conductor 21 and a jacket 22 covering the conductor 21. The conductor 21 is, for example, a stranded wire formed by twisting strands made of a conductive metal material such as copper, a copper alloy, aluminum or an aluminum alloy. The jacket 22 is formed of a resin material having flexibility and insulating properties. In the electric wire 11, the jacket 22 is removed at both ends, and a part of the conductor 21 is exposed.

The electric wire 11 has the terminal fitting 12 connected to one end, and the exposed conductor 21 at the other end is joined to an exposed conductor of another electric wire, a bus bar, a terminal including a relay terminal, and the like by an ultrasonic joining processing. Exposed strands of the conductor 21 at the other end may be joined to each other and integrated by the ultrasonic joining processing.

The terminal fitting 12 is formed, for example, by processing a plate made of a conductive metal material such as copper, a copper alloy, aluminum, or an aluminum alloy. The terminal fitting 12 has an electric wire connection part 31 and an electric connection part 32.

Figure 2:
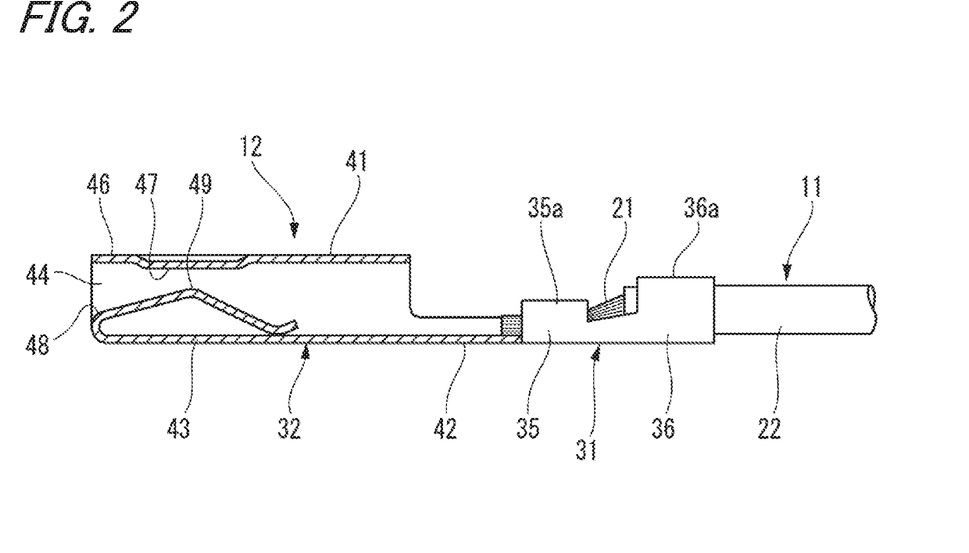
FIG. 2 is a cross-sectional view showing a part of a terminal fitting connected to one end of the electric wire.

FIG. 2 is a cross-sectional view showing a part of the terminal fitting connected to one end of the electric wire.

As shown in FIG. 2, the electric wire connection part 31 of the terminal fitting 12 has a conductor crimping portion 35 and a coating crimping portion 36. The conductor crimping portion 35 has a pair of conductor crimping pieces 35a, and the coating crimping portion 36 has a pair of coating crimping pieces 36a. In the electric wire connection part 31, by crimping the conductor crimping pieces 35a, the conductor 21 of the electric wire 11 is crimped and fixed to the conductor crimping portion 35, and by crimping the coating crimping pieces 36a, a portion of the jacket 22 of the electric wire 11 is crimped and fixed to the coating crimping portion 36. Accordingly, the terminal fitting 12 and the electric wire 11 are connected, and the terminal fitting 12 and the conductor 21 of the electric wire 11 are conducted.

The electric connection part 32 of the terminal fitting 12 includes a rectangular tubular box portion 41 into which a pin-shaped tab (not shown) formed on a male terminal of a connection partner is inserted from a front end side. The box portion 41 has a rear end side opposite to a tab insertion side connected to the electric wire connection part 31 via a connection portion 42.

The box portion 41 includes a bottom plate portion 43, side plate portions 44 and 45, and an upper plate portion 46. The side plate portions 44 and 45 are raised from both side edges of the bottom plate portion 43. The upper plate portion 46 is provided so as to cover an upper part of the box portion 41. On the upper plate portion 46, a contact 47 projecting inward of the box portion 41 is formed. A rear end side of the bottom plate portion 43 on an electric wire connection part 31 side serves as the connection portion 42. The bottom plate portion 43 has a spring contact 48. The spring contact 48 is connected to a front end side of the bottom plate portion 43 and is folded back toward the rear end side. The spring contact 48 has a pressing contact 49 projecting inward of the box portion 41.

The tab of the male terminal is inserted into the electric connection part 32 from a front side of the box portion 41. Then, the tab enters between the contact 47 of the upper plate portion 46 and the pressing contact 49 of the spring contact 48, and the contact 47 and the pressing contact 49 contact an outer surface of the tab by an elastic force of the spring contact 48. Accordingly, the terminal fitting 12 and the male terminal are electrically connected.

When the electric wire 11 is connected to the terminal fitting 12 at one end and an ultrasonic joining processing is performed on the conductor 21 exposed at the other end of the electric wire 11 in the above terminal-equipped electric wire 10, an ultrasonic vibration is transmitted to the terminal fitting 12 via the electric wire 11. Then, in the terminal fitting 12 connected to one end of the electric wire 11, the spring contact 48 vibrates, and a large burden may be applied to a portion connected to the bottom plate portion 43. Then, there is a possibility that a portion of the spring contact 48 connected to the bottom plate portion 43 may be damaged, resulting in a quality deterioration.

Therefore, in the manufacturing method according to the present embodiment, the ultrasonic joining processing is performed at the other end of the electric wire 11 while reducing damage to the terminal fitting 12.

Next, a method of manufacturing the terminal-equipped electric wire 10 according to the present embodiment will be described.

Figure 3:
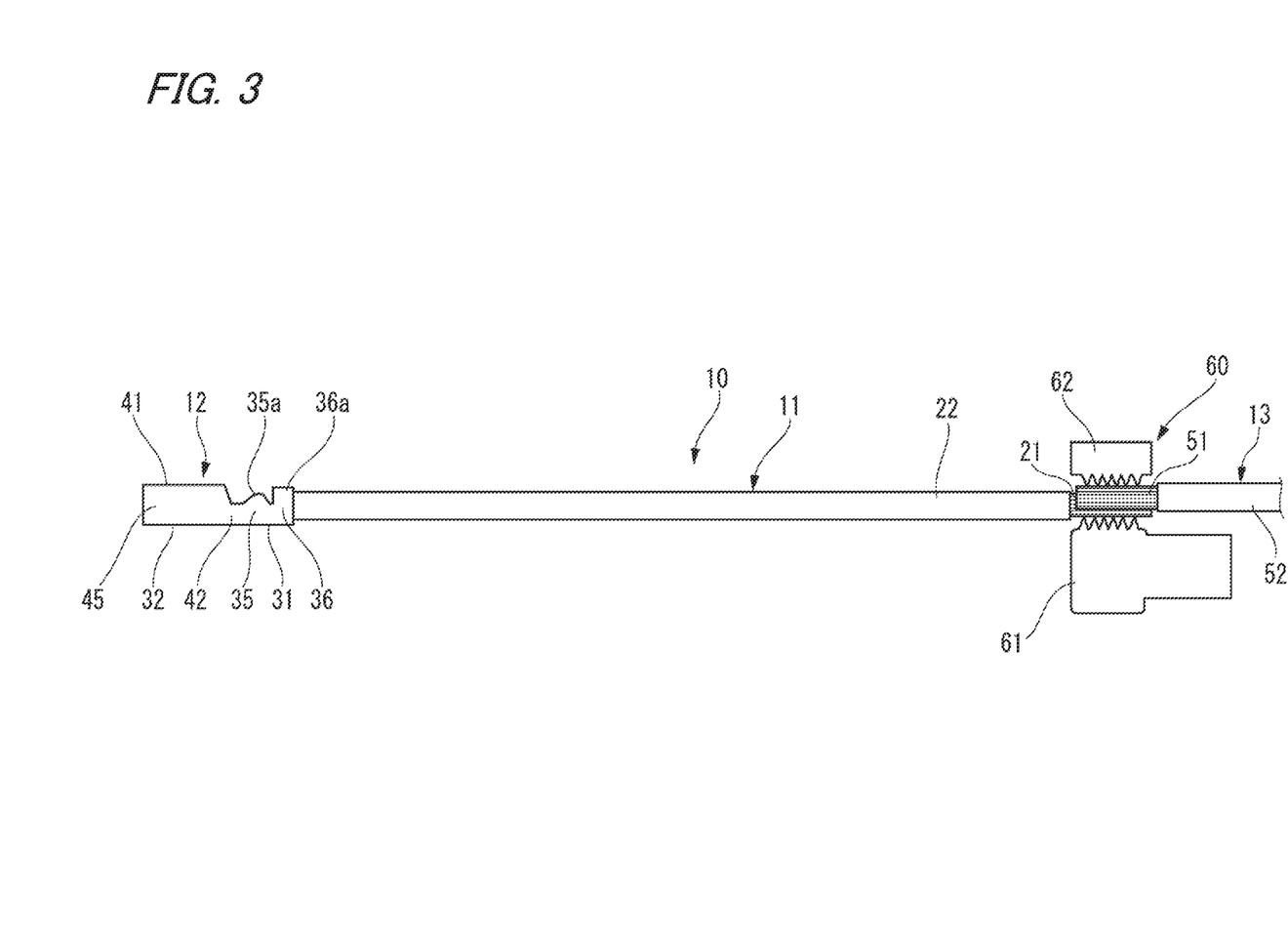
FIG. 3 is a schematic side view of the terminal-equipped electric wire in a course of manufacture, showing a method of manufacturing a terminal-equipped electric wire according to the embodiment of the invention.
Figure 4:
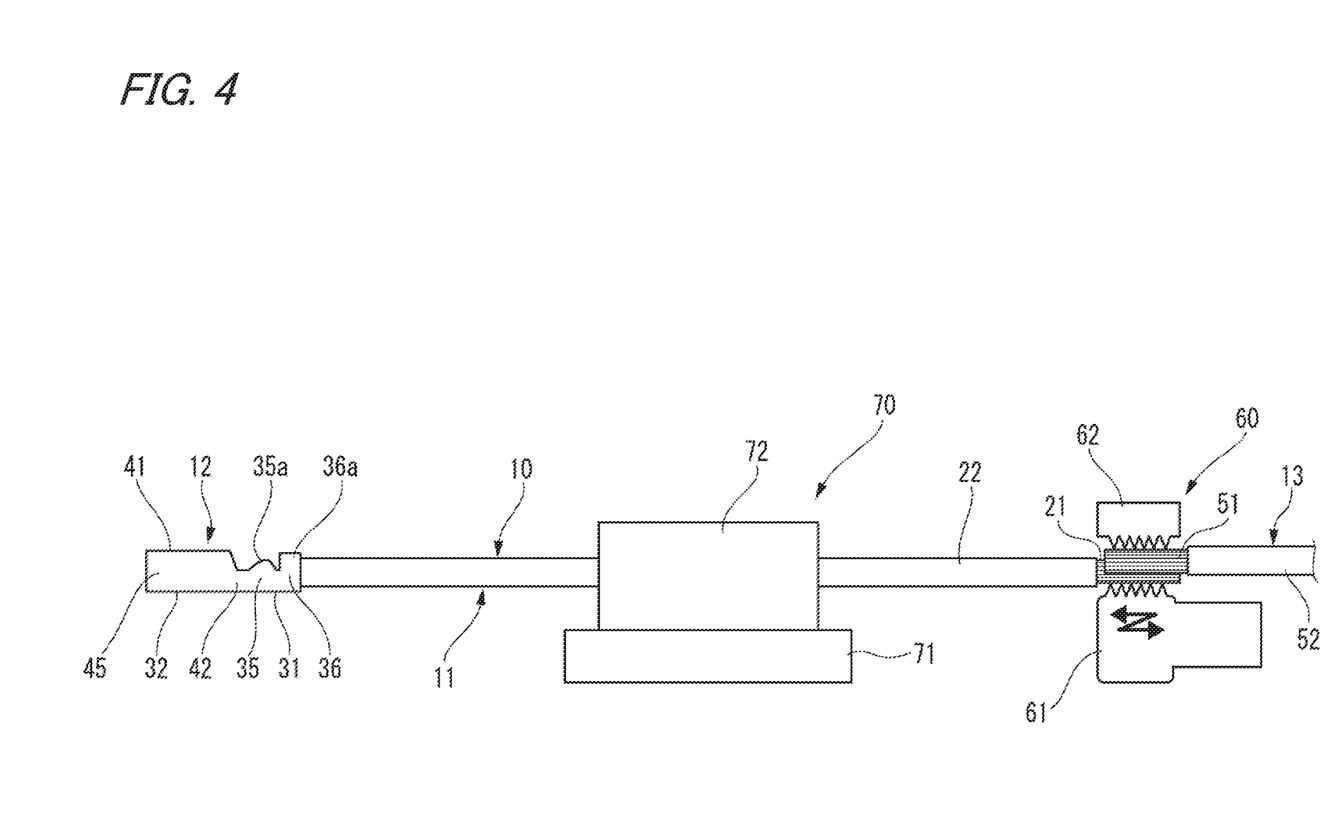
FIG. 4 is a schematic side view of the terminal-equipped electric wire in the course of manufacture, in a method of manufacturing a terminal-equipped electric wire according to the embodiment of the invention.
Figure 5:
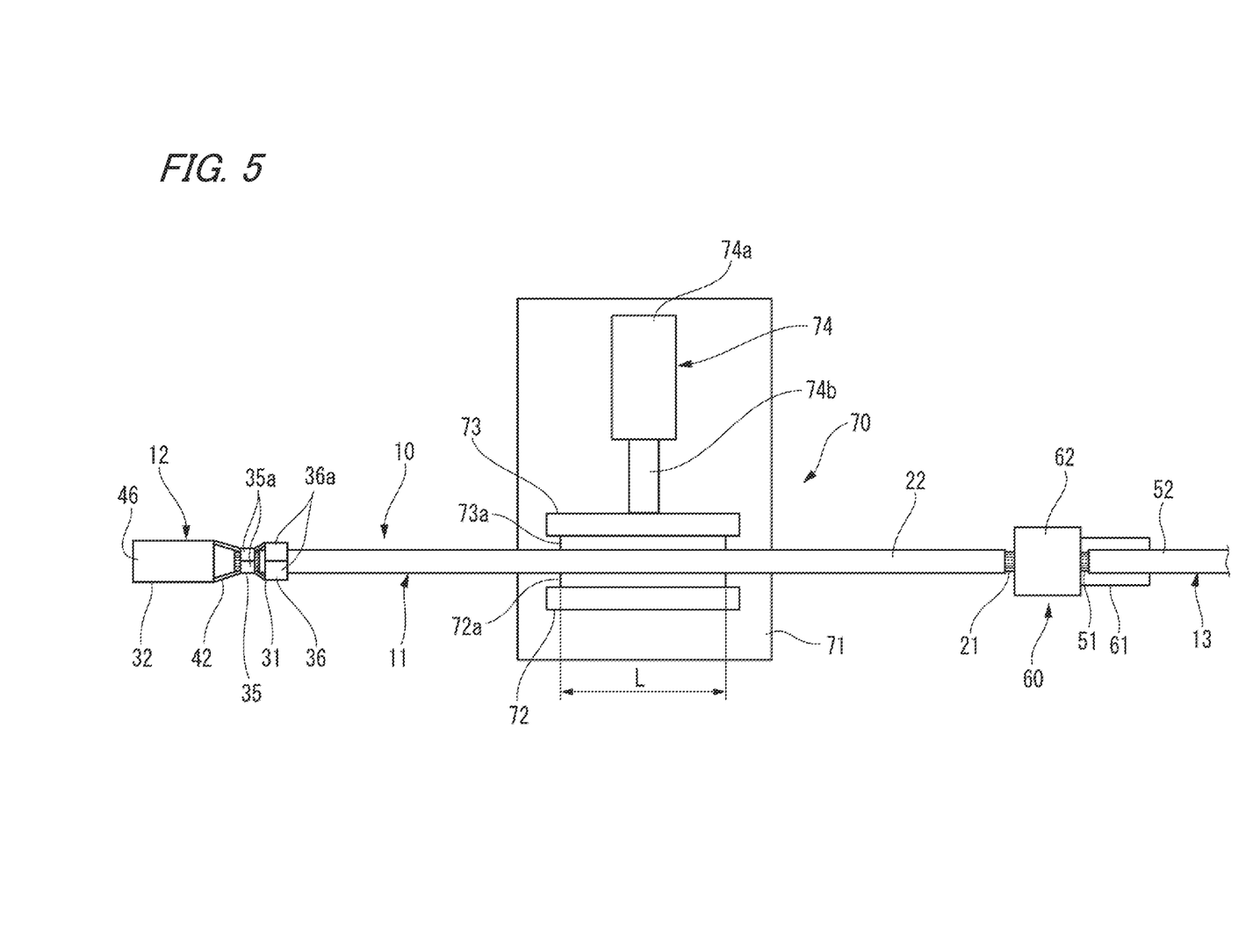
FIG. 5 is a schematic plan view of the terminal-equipped electric wire in the course of manufacture, in a method of manufacturing a terminal-equipped electric wire according to the embodiment of the invention.

FIG. 3 is a schematic side view of the terminal-equipped electric wire in a course of manufacture, showing a method of manufacturing a terminal-equipped electric wire according to the present embodiment. FIG. 4 is a schematic side view of the terminal-equipped electric wire in the course of manufacture, in a method of manufacturing a terminal-equipped electric wire according to the present embodiment. FIG. 5 is a schematic plan view of the terminal-equipped electric wire in the course of manufacture, in a method of manufacturing a terminal-equipped electric wire according to the present embodiment. Hereinafter, a case where two conductors of the electric wire are joined by an ultrasonic joining device 60 will be described as an example.

First, a part of the jacket 22 at both ends of the electric wire 11 is removed to expose the conductor 21, and the terminal fitting 12 is crimped and fixed to one end of the electric wire 11. Specifically, one end of the electric wire 11 is disposed at the electric wire connection part 31 of the terminal fitting 12, and the conductor crimping pieces 35a and the coating crimping pieces 36a of the electric wire connection part 31 are crimped. Accordingly, the conductor 21 of the electric wire 11 is crimped and fixed to the conductor crimping portion 35, and the portion of the jacket 22 of the electric wire 11 is crimped and fixed to the coating crimping portion 36. In another electric wire 13, a jacket 52 is removed at an end portion to expose a conductor 51. Also in the electric wire 13, the conductor 51 is a stranded wire formed by twisting strands made of a conductive metal material such as copper, a copper alloy, aluminum or an aluminum alloy, and the jacket 52 is formed of a resin material having flexibility and insulating properties.

Next, as shown in FIG. 3, the conductor 21 exposed at the other end of the electric wire 11 and the conductor 51 exposed at an end portion of the electric wire 13 are disposed in the ultrasonic joining device 60. The ultrasonic joining device 60 has a horn 61 and an anvil 62. The horn 61 includes a vibrator (not shown) that causes an ultrasonic vibration by supplying an alternating current, and is vibrated by the vibrator. The exposed conductor 21 and conductor 51 are disposed between the horn 61 and the anvil 62, and are clamped between the horn 61 and the anvil 62 with a load from the anvil 62. In FIGS. 3 to 5, the electric wire 11 and the electric wire 13 extend in an opposite direction with respect to the ultrasonic joining device 60, whereas the electric wire 11 and the electric wire 13 may extend in the same direction.

Further, as shown in FIGS. 4 and 5, a clamping jig 70 is disposed at an intermediate portion of the electric wire 11. The clamping jig 70 includes a base 71, a fixed part 72, a movable part 73, and a drive mechanism 74. The fixed part 72 and the movable part 73 are erected on the base 71 at opposing positions with a gap therebetween. The fixed part 72 is fixed to the base 71, and the movable part 73 is supported so as to be movable in a direction to approach and separate from the fixed part 72. The fixed part 72 and the movable part 73 have pads 72a and 73a on opposing surfaces. As the pads 72a and 73a, for example, a plate body such as a hard resin is used. The drive mechanism 74 includes a cylinder 74a and a rod 74b. In the present embodiment, the drive mechanism 74 is implemented by an air cylinder in which the rod 74b advances and retreats with respect to the cylinder 74a by supplying air. The rod 74b has its end connected to the movable part 73.

Then, the intermediate portion of the electric wire 11 is disposed between the pads 72a and 73a of the fixed part 72 and the movable part 73 of the clamping jig 70, and after that, the movable part 73 is moved in a direction approaching the fixed part 72 by the drive mechanism 74. Accordingly, a range of a predetermined length L is clamped with the pads 72a and 73a of the fixed part 72 and the movable part 73 at the intermediate portion in a length direction of the electric wire 11. The range of the predetermined length L is, when a node of the ultrasonic vibration applied to the other end and transmitted to the conductor 21 of the electric wire 11 is located at a clamping position with the pads 72a and 73a, a range in which both sides of the node can be sufficiently clamped. That is, the predetermined length L is set to a length such that the clamping position is not only at one point that becomes a node. When the predetermined length L is equal to or longer than an interval between nodes, even if any position of the intermediate portion in the length direction of the electric wire 11 is clamped, the vibration can be effectively reduced because the vibration includes a peak of the ultrasonic vibration, but the vibration may be shorter as long as both sides of the node can be sufficiently clamped.

A clamping force of the pads 72a and 73a is set to be weaker than a force of plastic deformation of the jacket 22 of the electric wire 11, and is such that the jacket 22 clamped with the pads 72a and 73a is hardened and a friction of the jacket 22 against the conductor 21 is increased.

When the electric wire 11 is clamped with the clamping jig 70, the ultrasonic joining device 60 performs an ultrasonic joining processing on the conductor 21 and the conductor 51 at the other end of the electric wire 11 and at the end portion of the electric wire 13. Specifically, an alternating current is supplied to the vibrator while the conductor 21 and the conductor 51 are clamped with the horn 61 and the anvil 62 of the ultrasonic joining device 60. By ultrasonically vibrating the horn 61 by the vibrator, an ultrasonic vibration energy is propagated to the conductor 21 and the conductor 51, and oxide films on surfaces of strands of the conductor 21 and the conductor 51 are broken, removed, and joined to each other.

At this time, an ultrasonic vibration applied to the conductor 21 at the other end of the electric wire 11 is transmitted as a longitudinal wave toward one end side of the electric wire 11. However, this vibration is attenuated at the intermediate portion of the electric wire 11 clamped with the clamping jig 70, and a transmission to one end to which the terminal fitting 12 is connected is reduced.

As described above, according to the method of manufacturing the terminal-equipped electric wire 10 according to the present embodiment, when the ultrasonic vibration is applied to the other end of the electric wire 11, the vibration transmitted through the conductor 21 of the electric wire 11 is attenuated at the intermediate portion of the electric wire 11 clamped with the pair of pads 72a and 73a, and the transmission to one end to which the terminal fitting 12 is connected is reduced. Accordingly, it is possible to reduce an influence of the vibration on the terminal fitting 12 connected to one end of the electric wire 11 and reduce product defects.

Compared with a method of attenuating a vibration by winding the electric wire 11 around a columnar jig and making the electric wire 11 deformed, a high-quality terminal-equipped electric wire 10 can be manufactured without performing a correction operation of the electric wire 11 which is a complicated post-joining operation after the ultrasonic joining processing.

The ultrasonic vibration applied to the conductor 21 at the other end of the electric wire 11 is transmitted as a longitudinal wave toward one end side of the electric wire 11 to which the terminal fitting 12 is connected. The longitudinal wave transmitted to the electric wire 11 has a peak where the vibration attains a maximum value and a node where the vibration attains a minimum value. Positions of a peak and a node of the vibration vary depending on a material and a thickness of the electric wire 11, a number of strands, whether the conductor 21 is a twisted wire, a degree of twist of the conductor 21, and the like. As described above, when the positions of the peak and the node of the vibration vary depending on the conditions, if a position where the electric wire 11 is clamped is only at a node of the vibration, it is difficult to have a sufficient attenuating effect. However, in the present embodiment, since the range of the predetermined length L at the intermediate portion of the electric wire 11 is clamped with the pair of pads 72a and 73a, even if a node of vibration is located in a clamping range of the electric wire 11, both sides of this node of vibration can be sufficiently clamped, and the vibration can be reliably attenuated.

A frequency of the ultrasonic vibration applied when performing the ultrasonic joining processing on the conductor 21 of the electric wire 11 fluctuates little by little around a certain frequency. Therefore, as in the present embodiment, by clamping the electric wire 11 between surfaces of the pair of pads 72a and 73a, it is possible to effectively attenuate even a vibration whose frequency fluctuates little by little.

As in the present embodiment, a case where the range of the predetermined length L at the intermediate portion of the electric wire 11 is clamped with the pair of pads 72a and 73a is equivalent to a set of a case where one point is clamped, so that an effect of reducing a vibration even with a plurality of frequencies is obtained.

In the present embodiment, the electric wire 11 is clamped with a clamping force which is set to be weaker than the force of plastic deformation of the jacket 22 of the electric wire 11, and is such that the jacket 22 is hardened by pressing with the pads 72a and 73a and the friction of the jacket 22 against the conductor 21 is increased. Therefore, it is possible to effectively attenuate the ultrasonic vibration transmitted as a longitudinal wave vibrating the conductor 21 of the electric wire 11 along the length direction by generating an appropriate frictional force between the jacket 22 and the conductor 21 while reducing a quality deterioration due to the plastic deformation of the jacket 22 of the electric wire 11. Compared with clamping one point, even if a pressure applied per unit area is the same, the frictional force between the jacket and the conductor in the entire clamping range can be increased by clamping the range of the predetermined length L. On the contrary, since a required pressure can be reduced in order to obtain the same frictional force for a case where the range of the predetermined length L is clamped and a case where one point is clamped, the plastic deformation of the jacket can be prevented.

The drive mechanism 74 for moving the movable part 73 in the clamping jig 70 is not limited to an air cylinder, and a mechanism for urging the movable part 73 to the fixed part 72 by an elastic member such as a spring, and a mechanism for transmitting a drive force of a motor or the like to the movable part 73 by a link mechanism or a ball screw mechanism to move the movable part 73 in a direction to approach and separate from the fixed part 72 may be used.

The pads 72a and 73a of the fixed part 72 and the movable part 73 that clamp the electric wire 11 are not limited to a hard resin plate body, but may be a soft material such as urethane or a metal plate.

Here, since the ultrasonic vibration transmitted through the conductor 21 of the electric wire 11 is mainly a longitudinal wave (compression wave), in order to reduce this vibration, it is preferable that a surface of the electric wire 11 is fixed so as to be clamped with the pads 72a and 73a, instead of controlling fluttering of the electric wire 11 corresponding to a transverse wave. It is preferable to use a soft material such as urethane or rubber as the pads 72a and 73a, because even when a plurality of electric wires having different outer diameters are clamped, the electric wires can be clamped and the vibration can be attenuated. On the other hand, when the pads 72a and 73a made of a hard resin or metal are used, a larger surface pressure is obtained when the electric wire 11 is clamped, so that the vibration can be efficiently attenuated.

The invention is not limited to the above embodiment, and can be appropriately modified and improved. In addition, a material, a shape, a size, a number, position, and the like of each component in the embodiment described above are optional and not limited as long as the invention can be achieved.

In the above embodiment, the conductor 21 and the conductor 51 are joined and integrated by the ultrasonic joining processing, but the ultrasonic joining processing is not limited to this case. For example, the strands of the conductor 21 may be joined and integrated by an ultrasonic joining processing. Alternatively, members such as a terminal and a bus bar may be joined to the conductor 21 by an ultrasonic joining processing.

Figure 6:
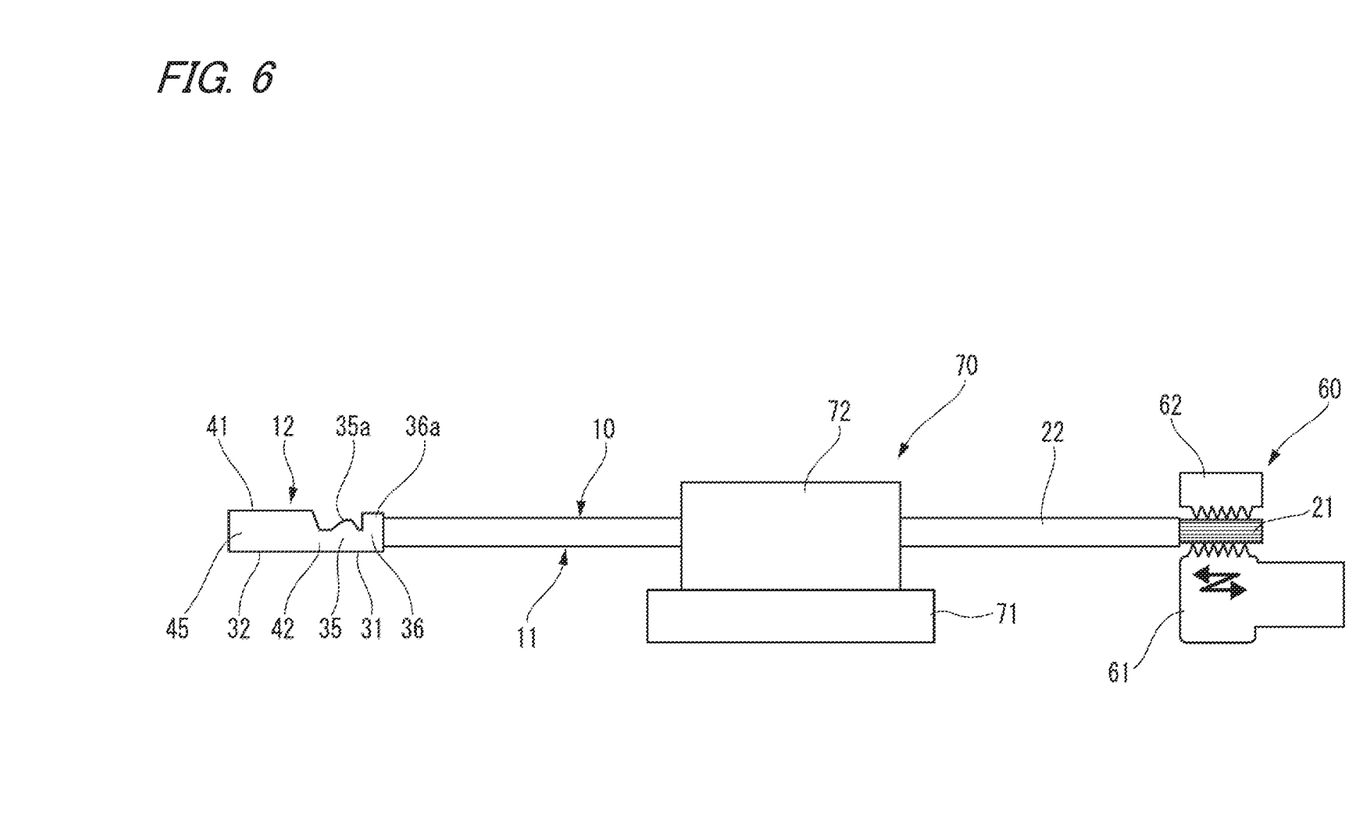
FIG. 6 is a schematic side view of the terminal-equipped electric wire in the course of manufacture, showing another example of the manufacturing method.

Here, the terminal-equipped electric wire 10 in which the strands of the conductor 21 exposed at the other end of the electric wire 11 are joined to each other will be described. FIG. 6 is a schematic side view of the terminal-equipped electric wire in the course of manufacture, showing another example of the manufacturing method.

As shown in FIG. 6, in another example of the manufacturing method, only the conductor 21 exposed at the other end of the electric wire 11 is disposed in the ultrasonic joining device 60. Then, the clamping jig 70 is disposed at the intermediate portion of the electric wire 11. Then, the intermediate portion of the electric wire 11 is disposed between the pads 72*a* and 73*a* of the fixed part 72 and the movable part 73 of the clamping jig 70, and after that, the movable part 73 is moved in a direction approaching the fixed part 72 by the drive mechanism 74. Accordingly, a range of a predetermined length L is clamped with the pads 72*a* and 73*a* of the fixed part 72 and the movable part 73 at the intermediate portion in a length direction of the electric wire 11. After the electric wire 11 is clamped with the clamping jig 70, the ultrasonic joining device 60 performs an ultrasonic joining processing on the conductor 21 at the other end of the electric wire 11.

As described above, even when the strands of the conductor 21 exposed at the other end of the electric wire 11 are ultrasonically joined to each other, by clamping the intermediate portion of the electric wire 11 with the clamping jig 70, a vibration of the internal conductor 21 can be reduced and attenuated via the jacket 22. Accordingly, it is possible to reduce the transmission of the vibration to one end to which the terminal fitting 12 is connected, and reduce the influence of the vibration on the terminal fitting 12 connected to one end of the electric wire 11 and reduce the product defects. It is possible to reduce, even when a member other than the terminal fitting 12 is attached to the other end of the electric wire 11, the influence of the vibration on the member.

Figure 7:
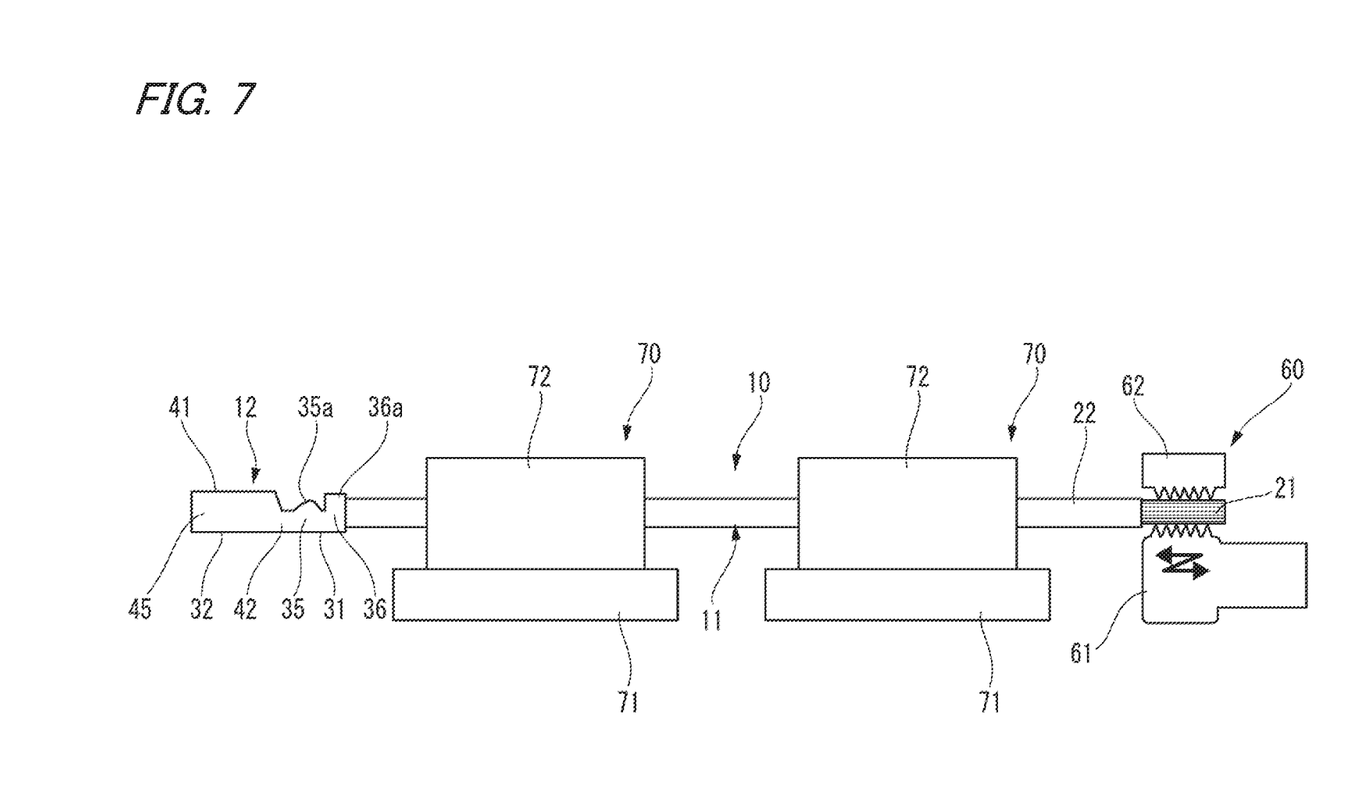
FIG. 7 is a schematic side view of the terminal-equipped electric wire in the course of manufacture, showing another example of the manufacturing method.

The clamping position at the intermediate portion of the electric wire 11 by the clamping jig 70 is not limited to one position, and may be a plurality of positions. For example, as shown in FIG. 7, when performing the ultrasonic joining processing by applying the ultrasonic vibration to the other end of the electric wire 11, clamping jigs 70 are provided at a plurality of positions spaced apart in the length direction at the intermediate portion of the electric wire 11, and these clamping jigs 70 may clamp and press the range of the predetermined length L in the length direction of the electric wire 11 from both sides by the pads 72*a* and 73*a*.

As described above, at a plurality of positions spaced apart in the length direction at the intermediate portion of the electric wire 11, if the range of the predetermined length L in the length direction is clamped and pressed from both sides with the pads 72*a* and 73*a*, the vibration whose nodes fluctuate in the length direction of the electric wire 11 can be more effectively attenuated at the plurality of positions in the length direction of the electric wire 11.

Here, characteristics of the method of manufacturing a terminal-equipped electric wire and a method of damping an electric wire according to the embodiment of the invention will be briefly described below in [1] to [4].

[1] A method of manufacturing a terminal-equipped electric wire, including:

connecting a terminal fitting (12) to one end of an electric wire (11) in which a conductor (21) is covered with a jacket (22);

clamping a range of a predetermined length (L) in a length direction at an intermediate portion of the electric wire (11) with a pair of plate bodies (pads 72*a*, 73*a*); and performing an ultrasonic joining processing by applying an ultrasonic vibration to the conductor (21) exposed at the other end of the electric wire (11).

[2] The method of manufacturing a terminal-equipped electric wire according to [1], including:

when performing the ultrasonic joining processing by applying the ultrasonic vibration to the other end of the electric wire (11), spacing apart a plurality of the pair of plate bodies (pads 72*a*, 73*a*) in the length direction at the intermediate portion of the electric wire (11).

[3] The method of manufacturing a terminal-equipped electric wire according to [1], including:

clamping the electric wire (11) with a clamping force which is set to be weaker than a force of plastic deformation of the jacket (22) of the electric wire (11), and is such that the jacket (22) is hardened by pressing with the plate bodies (pads 72*a*, 73*a*) and a friction of the jacket (22) against the conductor (21) is increased.

[4] A method of damping an electric wire, including:

clamping, by a pair of plate bodies (pads 72*a*, 73*a*), a range of a predetermined length (L) in a length direction at an intermediate portion of an electric wire (11) in which a conductor (21) is covered with a jacket (22); and performing an ultrasonic joining processing by applying an ultrasonic vibration to the conductor (21) exposed at an end portion of the electric wire (11).

What is claimed is:

1. A method of manufacturing an assembly, comprising:
connecting a terminal fitting to one end of an electric wire in which a conductor is covered with a jacket;
clamping a range of a predetermined length in a length direction at an intermediate portion of the electric wire with a pair of plate bodies, wherein the pair of plate bodies have surfaces that contact the electric wire, and the surfaces have a flat plate shape; and
performing an ultrasonic joining processing by applying an ultrasonic vibration to the conductor exposed at the other end of the electric wire,
wherein the ultrasonic vibration applied to the conductor exposed at the other end of the electric wire is transmitted as a longitudinal wave toward the one end of the electric wire to which the terminal fitting is connected, the longitudinal wave has one or more peaks where the vibration attains a maximum value and two or more nodes where the vibration attains a minimum value at each of the nodes, each of the one or more peaks is between adjacent nodes of the two or more nodes, and the predetermined length is equal to or longer than an interval between the adjacent nodes.

2. The method of manufacturing an assembly according to claim 1, comprising:
when performing the ultrasonic joining processing by applying the ultrasonic vibration to the other end of the electric wire, spacing apart a plurality of the pair of plate bodies in the length direction at the intermediate portion of the electric wire.

3. The method of manufacturing an assembly according to claim 1, comprising:
clamping the electric wire with a clamping force which is set to be weaker than a force of plastic deformation of the jacket of the electric wire, and is such that a friction of the jacket against the conductor is increased.

4. A method of damping an electric wire, comprising:
clamping, by a pair of plate bodies, a range of a predetermined length in a length direction at an intermediate portion of an electric wire in which a conductor is covered with a jacket, wherein the pair of plate bodies have surfaces that contact the electric wire, and the surfaces have a flat plate shape; and performing an ultrasonic joining processing by applying an ultrasonic vibration to the conductor exposed at an end portion of the electric wire, wherein the ultrasonic vibration applied to the conductor exposed at the other end of the electric wire is transmitted as a longitudinal wave toward the one end of the electric wire to which the terminal fitting is connected, the longitudinal wave has one or more peaks where the vibration attains a maximum value and two or more nodes where the vibration attains a minimum value at each of the nodes, each of the one or more peaks is between adjacent nodes of the two or mode nodes, and the predetermined length is equal to or longer than an interval between the adjacent nodes.

\* \* \* \* \*